Dec. 4, 1928.

A. I. KAPLON 1,694,181

BRAKING DEVICE FOR VEHICLES

Filed Dec. 9, 1926

Inventor:
Abraham I. Kaplon
By Chapman & Ferguson
Attorney.

Patented Dec. 4, 1928.

1,694,181

UNITED STATES PATENT OFFICE.

ABRAHAM I. KAPLON, OF BRUNSWICK, MARYLAND.

BRAKING DEVICE FOR VEHICLES.

Application filed December 9, 1926. Serial No. 153,707.

This invention relates to improvements in power transmission system for automobiles and other motor vehicles and has for its object to provide means to prevent the backing of the automobile on grades before the clutch is thrown in and the engine started. The invention consists of the novel construction and arrangement of the parts and combination of the parts hereinafter more fully set forth in the following specification and pointed out in detail in the appended claims.

In the accompanying drawing—

Figure 1:
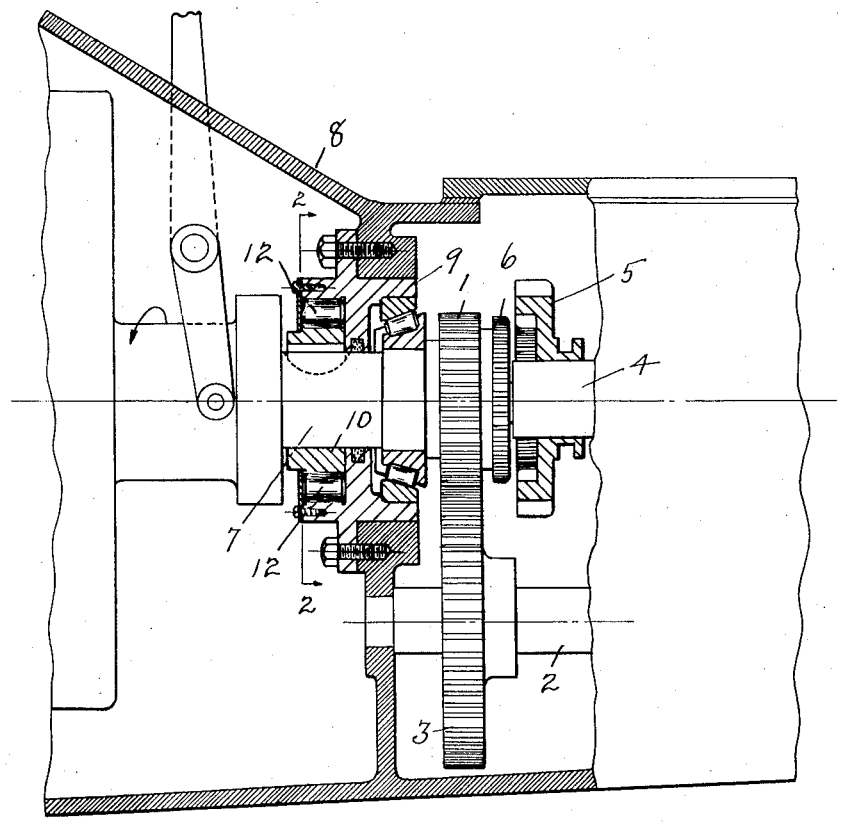
Figure 1 is a side elevation partly in section of the transmission gear box showing my invention applied thereto.
Figure 2:
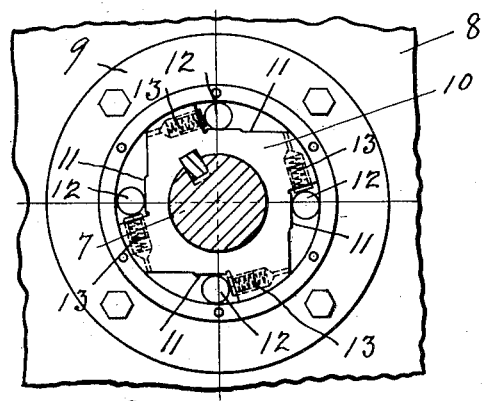
Figure 2 is a detail section on the line 2—2 of Figure 1.

Referring to the accompanying drawings 1 designates the stem gear on the clutch shaft which latter is adapted to be connected to the engine of the automobile. 2 is the counter shaft having a gear 3 thereon which is always in mesh with the gear 1 on the clutch shaft. The shaft 4 leads to the rear of the machine and is suitably connected with the drive wheel thereof. Mounted on the said shaft 4 is the first shift gear 5 adapted to mesh with gear 6 on the clutch shaft 7. The said shafts 2 and 4 are provided with the usual shift gears for the various speeds and reverse. Bolted to the housing 8 is a collar 9 through which the clutch shaft 7 passes. Keyed to the said shaft 7 is a disk 10 having a number of cam faces 11 and between said cam faces 11 and the collar 9 are rollers 12 against which the coil springs 13 exert their pressure at all times. It will thus be seen that when the automobile is standing on a grade and is about to start the clutch is thrown in so that the gear 5 engages the gear 6 and any tendency of the shaft 7 to reverse will cause the rollers 12 to lock between the cam face 11 and the collar 9 and prevent the machine from moving backward until the clutch can be thrown into engagement and the machine moves up grade and thus prevent any movement of the car down grade.

I claim—

1. The combination with a speed gear housing of a shaft adapted to be connected to the drive wheel of the vehicle, a clutch shaft having connection with the source of power changing speed gearing between said two shafts, and means between said clutch shaft and housing to prevent backward movement of the machine when in forward gear.

2. The combination with a speed gear housing of a shaft adapted to be connected to the drive wheel of the vehicle, a clutch shaft having connection with the source of power changing speed gearing between said two shafts, a disk keyed to the clutch shaft and having a number of cam faces thereon, rollers between said cam faces and housing to prevent backward movement of the vehicle when in forward gear.

3. The combination with a speed gear housing of a shaft adapted to be connected to the drive wheel of the vehicle, a clutch shaft having connection with the source of power changing speed gearing between said two shafts, a disk keyed to the clutch shaft and having a number of cam faces thereon, a collar bolted to the housing, and a roller between each cam face and said collar to prevent backward movement of the car when in forward gear.

In testimony whereof I affix my signature.

ABRAHAM I. KAPLON.